(12) United States Patent
Keller et al.

(10) Patent No.: US 7,944,101 B2
(45) Date of Patent: May 17, 2011

(54) BRUSH SYSTEM WITH A SUPPRESSION BOARD

(75) Inventors: Roland Keller, Bergtheim (DE); Gerald Viernekes, Hassfurt (DE); Klaus Zaps, Volkach (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 65 days.

(21) Appl. No.: 12/227,983

(22) PCT Filed: Jun. 5, 2007

(86) PCT No.: PCT/EP2007/055492
§ 371 (c)(1),
(2), (4) Date: Apr. 9, 2009

(87) PCT Pub. No.: WO2007/141249
PCT Pub. Date: Dec. 13, 2007

(65) Prior Publication Data
US 2010/0026114 A1     Feb. 4, 2010

(30) Foreign Application Priority Data

Jun. 7, 2006   (DE) ................. 10 2006 026 480

(51) Int. Cl.
H02K 5/22  (2006.01)
(52) U.S. Cl. ........................................... 310/71
(58) Field of Classification Search .......... 310/71, 310/72, DIG. 6
See application file for complete search history.

(56) References Cited

U.S. PATENT DOCUMENTS

| 5,196,750 | A | * | 3/1993 | Strobl ........................... 310/239 |
| 5,942,819 | A | | 8/1999 | Burgess et al. |
| 6,291,914 | B1 | * | 9/2001 | Mukaiyama ................. 310/68 B |
| 6,903,473 | B2 | * | 6/2005 | Matsuyama et al. ............. 310/71 |
| 6,906,438 | B2 | * | 6/2005 | Ursel et al. ....................... 310/89 |

FOREIGN PATENT DOCUMENTS

| DE | 9018070 U1 | 9/1994 |
| DE | 19858627 A1 | 6/2000 |
| DE | 10134863 A1 | 1/2003 |
| DE | 102005052722 B3 | 11/2005 |
| DE | 102005055740 A1 | 6/2006 |
| EP | 1193839 A2 | 4/2002 |
| EP | 1278276 A | 1/2003 |
| EP | 1619774 A1 | 7/2004 |
| EP | 1763123 A1 | 9/2005 |
| EP | 1710893 A | 10/2006 |

OTHER PUBLICATIONS

DE Office Action in Corresponding 102006026480.0 dated Jan. 26, 2007.

* cited by examiner

*Primary Examiner* — Dang D Le
(74) *Attorney, Agent, or Firm* — Manelli Denison & Selter PLLC; Edward J. Stemberger

(57) ABSTRACT

The invention relates to a brush system for a motor-vehicle actuating drive, having a base body, a board on which interference-suppression components are mounted, and electrically conductive plug contacts. The plug contacts each have an accommodation slot. The board is inserted into the accommodation slots in the plug contacts.

7 Claims, 4 Drawing Sheets

BRUSH SYSTEM WITH A SUPPRESSION BOARD

FIELD OF THE INVENTION

The invention relates to a brush system for a motor-vehicle actuating drive, which brush system has a board on which interference-suppression components are mounted.

BACKGROUND OF THE INVENTION

EP 1 619 774 A1 already discloses a brush system for a motor-vehicle actuating drive. The brush system described in that document has a base body, two power supply lines and two carbon brushes which are connected to in each case one of the power supply lines. The power supply lines serve as a base body on which the respective carbon brush is mounted. An interference-suppression coil is also welded onto each base body. The base body also serves as a support for a thermal protection element which protects the motor of the actuating drive against overheating.

Furthermore, EP 05 019 562.7 describes a brush system for a motor-vehicle actuating drive, which brush system has a board on which interference-suppression components are mounted. This board is positioned between the two base bodies of the brush system. The known brush system also has two interference-suppression coils and a respective compression spring for the two brushes of the brush system. The interference-suppression coils and the compression springs in each case form a common coil- and/or spiral-like component.

A further brush system for a motor-vehicle actuating drive, which brush system has a board on which interference-suppression components are mounted, is described in DE 10 2005 052 722.1. In this brush system, the board is retained by retaining elements which are constituent parts of a board pocket.

SUMMARY OF THE INVENTION

The invention is based on the object of specifying a brush system for a motor-vehicle actuating drive, with assembly of said brush system being simplified.

This object is achieved by virtue of a brush system having the features specified in claim 1. Advantageous refinements and developments of the invention are specified in the dependent claims.

The advantages of the invention are that no additional components are required to accommodate the board in the brush system on account of the use of the plug contacts, which are provided in any case and serve for connecting an external power supply, as accommodation elements for the board. To this end, the plug contacts, which are in the form of plug tongues for example, on their side which is averted from the plug-type connection, are designed such that the board can be mounted in the direction parallel to the axial direction of the electric motor by being simply inserted into the plug contacts and at the same time said plug contacts can make electrical contact with said board. To this end, the plug contacts have, on their side which is averted from the plug-type connection, in each case two limbs which are arranged substantially parallel to one another and between which an accommodation slot is formed. At least one of the respective limbs of a plug contact is preferably in the form of a sprung limb, so that the board which is inserted into the accommodation slot is firmly clamped by the spring action of the limb and electrical contact is also optionally established. In this case, the respectively second, opposite limb serves firstly as a guide rail along which the board is guided during installation, and secondly as a counterbearing against which the board is pushed and by means of which the board is positioned so as to be straightened in the final installation position. It goes without saying that electrical contact can be made with the board via the second limb too.

As a result, there is no need for additional mounting means and/or additional method steps for mounting the board on the base body of the brush system. In particular, no soldering or welding is required to mount the board on the base body of the brush system and/or to make electrical contact with the board.

Electrical conductor tracks are preferably provided on at least one of the outer surfaces of the board, by means of which electrical conductor tracks electrical contact is made with the respective plug contact in a simple manner by the interference-suppression components, which are mounted on the board, via the corresponding limb, in particular without needing to use additional copper wire, etc.

If in each case one limb of a plug contact, this is generally the limb which is of sprung design, is designed to be shorter than the other limb of the plug contact, the interference-suppression components can then advantageously be arranged on the same side of the board on which the shorter limb of the plug contact is also located. This reduces the amount of space required by the brush system.

The advantages of a brush system in which the interference-suppression components, which are mounted on the board, are covered by a terminating wall of the base body in their end regions which are remote from the board are that the interference-suppression components are positioned between the board and a wall of the brush housing and therefore are arranged so as to be protected. Inadvertent contact with or damage to the interference-suppression components is largely precluded.

A brush system according to the invention can also be protected against the build-up of undesirable charges by a ground contact element which is arranged between the board and the motor housing. In this case, the ground contact element is configured such that it is mounted on the border of the board by being simply plugged-on in the same joining direction as the board and at the same time is retained on the board border by a clamping action, and a corresponding contact area of the printed circuit board makes electrical contact with said ground contact element. The ground contact element also has, on its side which is averted from the board, a contact tongue of sprung design which automatically establishes electrical contact with the motor or transmission housing which adjoins the brush system during assembly. At the same time, abutment of the ground contact element against the adjoining housing in a sprung manner exerts a counterforce on the board, which force additionally retains the board in its position in the accommodation slots in the plug contacts without play.

DESCRIPTION OF THE DRAWINGS

Further advantageous properties of the invention can be gathered from the exemplary explanation of said properties with reference to the figures, in which.

Functionally identical objects and details are identified by the same reference symbols throughout the figures.

DETAILED DESCRIPTION OF THE PREFERRED EMBODIMENTS

Figure 1:
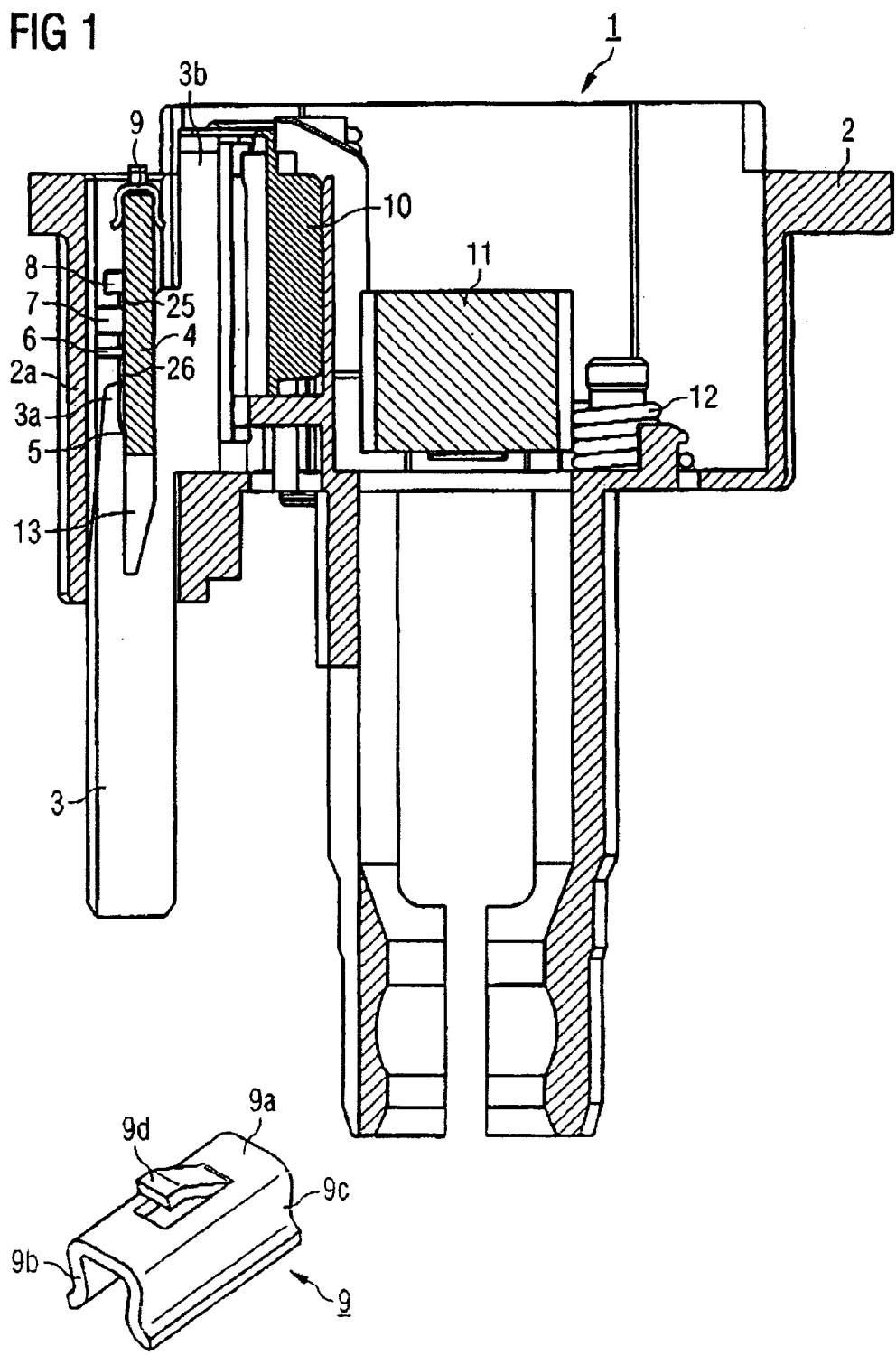
FIG. 1 shows a cross-sectional illustration of a brush system according to the invention.

FIG. 1 shows a cross-sectional illustration of a brush system according to the invention. The illustrated brush system 1 has a base body 2 on which a thermal protection element 10 and an interference-suppression coil 12 are mounted. Reference numeral 11 denotes a commutator. Furthermore, electrically conductive plug contacts 3, of which only one can be seen in FIG. 1, are inserted into the base body 2 which is composed of a plastic material. These plug contacts can be injection-molded directly during the production process of the base body by an injection-molding process, or can be subsequently placed or inserted into cutouts provided for them. The respective plug contact has, in its upper region, limbs 3a and 3b which delimit an accommodation slot 13. A board 4 is inserted into this accommodation slot 13. One or both of the limbs 3a and 3b of the plug contact 3 is/are of sprung design in the sense that the board 4 which is inserted into the accommodation slot 13 is firmly clamped in the accommodation slot 13.

The limb 3a is preferably of sprung design and is designed to be shorter than the limb 3b. The result of this is that a free space, in which the interference-suppression components 6, 7, 8 which are mounted on the board 4 are positioned, exists on that side of the board which faces this limb 3a, above said limb 3a. Space is saved by the interference-suppression components being positioned in this free space above the limb 3a of the plug contact 3, and so a brush system according to the invention can be designed in a compact fashion.

That limb 3b which is opposite the limb 3a of sprung design rests, over a relatively large length, directly or flat on the board 4, and thus ensures accurate and straightened positioning of the board 4. The board 4 is pressed against the counterbearing of the limb 3b, and held in position there, by the limb 3a.

As is also shown by FIG. 1, conductor tracks 25 and 26, by means of which the interference-suppression components make electrical contact with one another, are provided on the surface side of the board 4 on which the interference-suppression components 6, 7, 8 are mounted. The conductor track 26 furthermore extends as far as an electrical contact point 5 at which the limb 3a of the plug contact and therefore also the plug contact 3 make electrical contact with the conductor track 26 and therefore also the interference-suppression components which are connected to the conductor track 26. In the exemplary embodiment shown, no conductor tracks and no interference-suppression components are provided on the surface side of the board which is on the right-hand side in the figure.

The interference-suppression components 6, 7, 8 which are mounted on the board 4 are, in their end regions which are remote from the board, covered by a terminating wall 2a of the base body 2. Consequently, the interference-suppression board and the interference-suppression components which are mounted on it are protected against undesirable contact by the terminating wall 2a of the base body 2.

A ground contact element 9 is plugged onto the upper border of the board 4. This ground contact element is a clamping element which is realized in the form of a bent and stamped sheet metal part which is composed of spring steel. This bent and stamped sheet metal part is illustrated at the bottom of FIG. 1. It has a base surface 9a, two spring limbs 9b and 9c which extend downward, and a further spring limb 9d which is bent upward out of the base surface 9a. The ground contact element is clamped onto the board by means of the two spring limbs 9b and 9c, with the clamping action being produced by the spring force of the spring limbs. The spring limb 9d which is bent out in the upward direction serves to allow the motor housing, which is not illustrated in FIG. 1, of the actuating drive to make contact with the ground contact element, in order to dissipate undesirable charges from the board 4 to ground.

The above-described ground contact element can be pushed onto the board which is inserted into the accommodation slots 13 quickly and simply, and so the ground contact which is required to dissipate undesirable charges can be produced without a great deal of outlay, in particular without the need for soldering copper wire, when the actuating drive is assembled.

Figure 2:
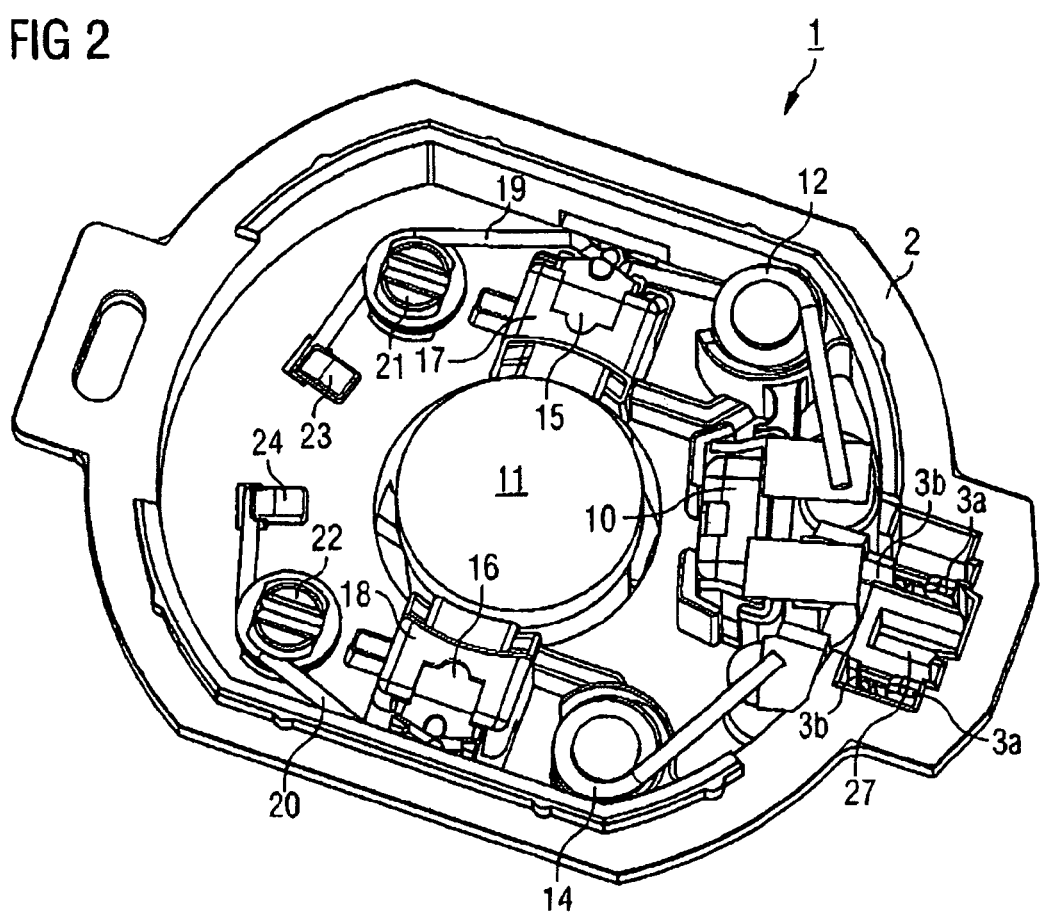
FIG. 2 shows a perspective view of a brush system according to the invention, with the board not yet inserted.

FIG. 2 shows a perspective view of a brush system according to the invention, with the board not yet inserted. This figure shows, in particular, the positioning of the two plug contacts with the limbs 3a and 3b within the brush system. As is illustrated with reference to FIGS. 3 and 4, the board 4, together with the interference-suppression components mounted on it and the conductor tracks, is inserted between the limbs 3a and 3b of the two plug contacts from above. FIG. 2 also shows that the shown brush system has a housing-like base body 2 which is provided with a circumferential border, a thermal protection element 10, interference-suppression coils 12 and 14, brushes 15 and 16, brush guides 17 and 18, limb springs 19 and 20, limb spring bearings 21 and 22 and also limb spring counterbearings 23 and 24. Reference numeral 11 denotes the commutator of the actuating drive.

FIG. 2 also shows that the base body 2 has a cutout 27 for accommodating the board. This cutout is dimensioned in such a way that its boundary walls do not touch the board which is inserted between the limbs 3a and 3b of the plug contacts and is firmly clamped there or the interference-suppression components which are mounted on the board, but ensure that said board and interference-suppression components are protected against contact from the outside. In this way, the cutout 27 serves as an insert shaft for the board 4.

Figure 3:
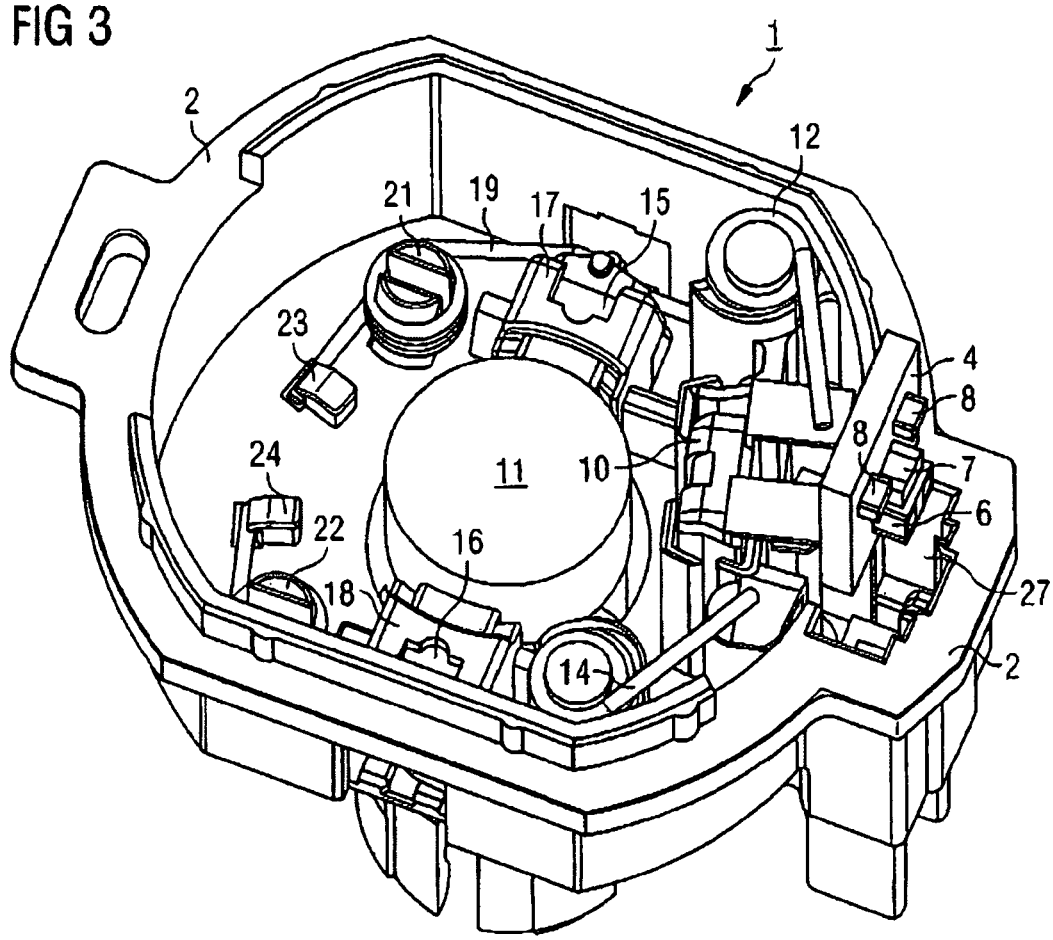
FIG. 3 shows a perspective view of a brush system according to the invention as insertion of the board is started.

FIG. 3 shows a perspective view of a brush system according to the invention as insertion of the board 4, together with the interference-suppression components 6, 7, 8 which are mounted on it, is started. It can be seen that the board is inserted from above, parallel to axial direction of the actuating drive, and that the surface side of the board on which the interference-suppression components are mounted is averted from the components 10, 12, 14 and 15-24 of the brush system during this insertion operation.

Figure 4:
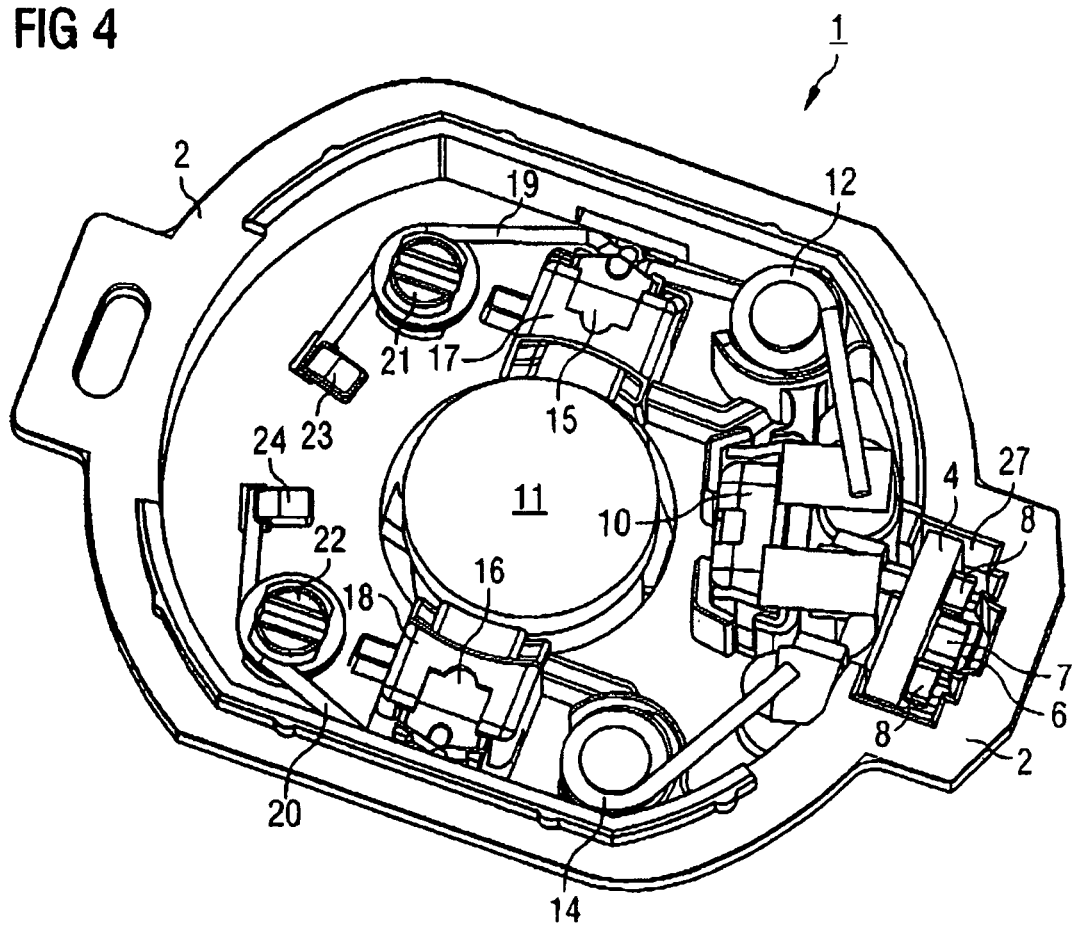
FIG. 4 shows a perspective view of a brush system according to the invention with the board inserted but still without ground contact of the board.

Finally, FIG. 4 shows a perspective view of a brush system according to the invention with the board 4 inserted, but still without ground contact of the board. This illustration shows that the board is fully inserted into the cutout 27 in the base body 2, which cutout is in the form of an insert shaft, so that the board and, in particular, also the interference-suppression components 6, 7, 8 which are mounted on it are protected by the walls of the base body 2 which surround the cutout 27.

If the board is inserted into the insert shaft of the base body 2, as is shown in FIG. 4, the brush system is inserted into the transmission housing of the actuating drive, the above-described ground contact element 9 is clamped onto the board, and the motor housing of the actuating drive makes contact with the ground contact element.

According to the above description, the invention provides a brush system for a motor-vehicle actuating drive, in which brush system the board which is fitted with the interference-suppression components is inserted into accommodation slots in the plug contacts of the brush system and therefore electrical contact is made with said board and said board is positioned in the brush system. The plug contacts preferably have limbs of sprung design, between which the board is firmly clamped after it is inserted. The base body of the brush system has a cutout which serves as an insert shaft when the board is inserted into the accommodation slots in the plug contacts. Permanent clamping of the board is ensured by virtue of the described clamping geometry of the plug contacts. Furthermore, the described clamping geometry advantageously also serves to enable the plug contacts to make electrical contact with the interference-suppression components which are mounted on the board, with this electrical contact being made using the conductor tracks which are provided on the board surface. The board can be attached in the plugging direction of the plug, parallel to the axis of the actuating drive, and, after it is inserted, is protected by the surrounding wall of the base body of the brush system. It is not necessary to make contact by means of soldering or welding since contact is established solely by virtue of the spring force of at least one of the limbs of the plug contacts. The use of the plug contacts which are present in any case for firmly clamping the board and for making electrical contact with the interference-suppression components which are mounted on the board by means of the conductor tracks which are provided on the surface of the board means that no additional costs arise for mounting the board and making electrical contact with the interference-suppression components.

The invention claimed is:

1. A brush system for a motor-vehicle actuating drive, comprising:
    a base body,
    a board on which interference-suppression components are mounted, and
    electrically conductive plug contacts which are to be connected to an external power supply,
    wherein the plug contacts, on their side which is averted from the plug-type connection, are configured such that the board can be mounted by being simply inserted into the plug contacts and at the same time said plug contacts can make electrical contact with said board,
    wherein the plug contacts have, on their side which is averted from the plug-type connection, in each case two limbs which are arranged substantially parallel to one another and between which an accommodation slot for accommodating the board is formed, and in that the board is inserted into the accommodation slots in the plug contacts, and
    wherein in each case one limb of a plug contact is configured to be shorter than the other limb of the plug contact, and in that the interference-suppression components which are mounted on the board are provided on the same outer surface of the board on which the shorter limb of the plug contact is also located.

2. The brush system of claim 1, wherein at least one of the two limbs is of sprung design, and so the board which is inserted into the accommodation slot is firmly clamped against the second limb by the spring action of the limb.

3. The brush system of claim 1, wherein the board is provided with conductor tracks on one of its outer surfaces, in that in each case at least one of the conductor tracks makes electrical contact with the interference-suppression components which are mounted on the board, and in that an interference-suppression component makes electrical contact with one of the plug contacts via one of the conductor tracks.

4. The brush system of claim 1, wherein the board, together with the interference-suppression components mounted on it, is accommodated in an insert shaft of the base body in the final installation position.

5. The brush system of claim 1, wherein the border of the board is provided with a ground contact element via which the motor housing of the motor-vehicle actuating drive can make electrical contact with said board.

6. The brush system of claim 5, wherein the ground contact element is a clamping element which is produced in the form of a bent and stamped sheet metal part which is composed of spring steel.

7. The brush system of claim 5, wherein the ground contact element has a base surface, two spring limbs which extend downward from the base surface, and a further spring limb which is bent upward out of the base surface.

* * * * *